US009346541B2

(12) United States Patent
Honnorat (10) Patent No.: US 9,346,541 B2
(45) Date of Patent: May 24, 2016

(54) MODULAR POWER PLANT AND AN AIRCRAFT PROVIDED WITH A LIFT ROTOR

(71) Applicant: AIRBUS HELICOPTERS, Marignane (FR)

(72) Inventor: Olivier Honnorat, Aix en Provence (FR)

(73) Assignee: Airbus Helicopters, Marignane (FR)

( * ) Notice: Subject to any disclaimer, the term of this patent is extended or adjusted under 35 U.S.C. 154(b) by 488 days.

(21) Appl. No.: 14/330,170

(22) Filed: Jul. 14, 2014

(65) Prior Publication Data
US 2015/0284074 A1 Oct. 8, 2015

(30) Foreign Application Priority Data
Jul. 16, 2013 (FR) ........................................ 13 01681

(51) Int. Cl.
*B64D 27/00* (2006.01)
*B64C 27/12* (2006.01)
*B64D 27/14* (2006.01)
*F02C 7/36* (2006.01)
*B64C 27/473* (2006.01)
*F02C 7/12* (2006.01)
(Continued)

(52) U.S. Cl.
CPC ............... *B64C 27/12* (2013.01); *B64C 27/473* (2013.01); *B64D 27/14* (2013.01); *F02C 7/12* (2013.01); *F02C 7/20* (2013.01); *F02C 7/36* (2013.01); *F16H 57/025* (2013.01); *F05D 2220/328* (2013.01); *F05D 2220/329* (2013.01); *F05D 2240/90* (2013.01); *F05D 2260/40311* (2013.01)

(58) Field of Classification Search
USPC .............. 60/805; 244/55, 53 B, 53 R, 54, 57, 244/17.11, 6
See application file for complete search history.

(56) References Cited

U.S. PATENT DOCUMENTS 2,625,006 A * 1/1953 Lundquist ............... F02B 41/10
60/607
2,933,892 A * 4/1960 Howard, Jr. ............. B64C 27/12
60/791
(Continued)

FOREIGN PATENT DOCUMENTS

DE 20006526 6/2000
FR 2905983 3/2008
(Continued)

OTHER PUBLICATIONS

French Search Report for FR 1301681, Completed by the French Patent Office on Mar. 27, 2014, 6 Pages.

*Primary Examiner* — Christopher P Ellis
(74) *Attorney, Agent, or Firm* — Brooks Kushman P.C.

(57) ABSTRACT

A power plant (10) having a main gearbox (20), a turbine engine (40), and a heat exchanger (60), the main gearbox (20) including a substantially vertical rotor mast (21). The main gearbox (20) comprises at least a rotary speed reduction stage arranged in a flat casing (22), and a pylon (23). The turbine engine (40) has an engine casing (42) with an outlet shaft projecting from said engine casing (42) and penetrating into said flat casing (22), said outlet shaft (41) being substantially parallel to the rotor mast (21), said engine casing (42) being offset longitudinally from the pylon (23) and not being in contact with the pylon (23). The heat exchanger (60) extends longitudinally behind said turbine engine (40), while, on the contrary, said rotor mast (21) is situated longitudinally in front of said turbine engine (40).

17 Claims, 4 Drawing Sheets (51) Int. Cl.
*F02C 7/20* (2006.01)
*F16H 57/025* (2012.01)

(56) References Cited

U.S. PATENT DOCUMENTS

| | | | | |
|---|---|---|---|---|
| 3,204,406 A | * | 9/1965 | Howes | F02C 3/10 60/39.17 |
| 3,581,496 A | * | 6/1971 | Eggebrecht | F02C 3/103 165/8 |
| 5,054,716 A | | 10/1991 | Wilson | |
| 5,108,043 A | | 4/1992 | Canavespe | |
| 5,226,350 A | | 7/1993 | Cycon et al. | |
| 5,243,815 A | * | 9/1993 | Maier | F02C 7/08 60/39.54 |
| 5,370,341 A | * | 12/1994 | Leon | B64C 27/10 244/17.11 |
| 5,823,470 A | | 10/1998 | Craig et al. | |
| 7,938,618 B2 | | 5/2011 | Baude | |
| 8,756,908 B2 | * | 6/2014 | Sheridan | F02C 7/06 60/39.08 |
| 2005/0115770 A1 | | 6/2005 | Sandrart et al. | |
| 2007/0240427 A1 | * | 10/2007 | Ullyott | F01D 25/12 60/801 |
| 2009/0113871 A1 | * | 5/2009 | Certain | B64C 27/12 60/39.43 |
| 2011/0121127 A1 | | 5/2011 | Certain | |
| 2011/0146226 A1 | * | 6/2011 | Wood | F02C 7/10 60/39.511 |
| 2012/0321460 A1 | | 12/2012 | Batlle | |
| 2013/0111923 A1 | * | 5/2013 | Donnelly | F02C 7/143 60/792 |
| 2015/0122944 A1 | * | 5/2015 | Dauriac | B64D 35/08 244/58 |
| 2015/0300248 A1 | * | 10/2015 | Schneider | F02C 3/04 60/805 |

FOREIGN PATENT DOCUMENTS

| | | |
|---|---|---|
| FR | 2956700 | 8/2011 |
| GB | 940024 | 10/1963 |
| WO | 9532895 | 12/1995 |
| WO | 0123255 | 4/2001 |

* cited by examiner

MODULAR POWER PLANT AND AN AIRCRAFT PROVIDED WITH A LIFT ROTOR

CROSS REFERENCE TO RELATED APPLICATION

This application claims priority to French patent application No. FR 13 01681 filed on Jul. 16, 2013, the disclosure of which is incorporated in its entirety by reference herein.

BACKGROUND OF THE INVENTION

1. Field of the Invention

The present invention relates to a modular power plant and also to an aircraft provided with a lift rotor that is driven in rotation by the power plant.

2. Description of Related Art

A power plant of such an aircraft usually includes a turbine engine driving a main gearbox.

A turbine engine usually comprises a gas turbine possessing a gas generator that drives a working turbine in rotation. The working turbine may be a so-called "free" turbine that is independent of the gas generator. The gas generator generally has at least one compression stage feeding a combustion chamber with compressed air.

The main gearbox includes a rotor mast for driving the lift rotor in rotation. Furthermore, the main gearbox may include an outlet for driving a rotor that controls yaw movement of the aircraft, for example.

Connection means and angle drive takeoff means may then possibly be interposed between the working turbine and the main gearbox. For example, such connection means include members for accommodating angular misalignments between two rotating shafts.

A turbine engine is generally arranged horizontally on a support platform. In other words, an outlet shaft from a turbine engine is in a horizontal position. Conversely, the support platform carries the main gearbox in a position that is substantially vertical, the rotor mast that is rotated by the main gearbox being substantially vertical.

Old generation turbine engines generally present considerable weight and size that can make them difficult to install. More particularly, such old generation turbine engines may present relatively high fuel consumption.

Certain modern turbine engines are nevertheless relatively compact. Turbine engines are known that comprise a single compression stage and a combustion chamber that is said to be "inverted" and that enables the overall size of the turbine engine to be greatly reduced. For convenience and in order to be able to identify it easily, such a turbine engine is referred to as a "compact turbine engine".

In order to improve the performance of a compact turbine engine, and in particular its fuel consumption, the power plant may include a heat exchanger. Although the turbine engine is indeed compact, the heat exchanger is found on the contrary to be bulky. By way of example, the heat exchanger serves to preheat the air between the outlet from a compression stage of the turbine engine and a combustion chamber of the turbine engine, by using hot gas taken from the outlet of the turbine engine.

The heat exchanger is then fastened to the turbine engine in order to heat the fresh air as compressed by the gas generator prior to entering the combustion chamber.

Thus, fresh air is sucked into the turbine engine and is then compressed by each compression stage. The compressed fresh air is directed into the heat exchanger in order to be heated prior to reaching the combustion chamber. Under such circumstances, the compressed air is burnt together with fuel so as to generate hot gas that expands through at least one turbine. The turbine engine can thus comprise a turbine that is connected to the compressor stages and a free working turbine, which turbines are rotated by said hot gas. The hot gas is then collected by the heat exchanger in order to heat the fresh air sucked in by the turbine engine prior to releasing the hot gas into the atmosphere.

The assembly comprising a compact turbine engine and a heat exchanger is then found to be bulky compared with a conventional engine, but in contrast, it may present limited fuel consumption.

Nevertheless, arranging such an assembly is not at all obvious.

Putting the heat exchanger into place can lead to an increase in the width and/or the height and/or the length of the covers of the aircraft. The total surface area of the aircraft, and in particular its frontal surface area, is then increased compared with a conventional installation. This can lead to an increase in the aerodynamic drag of the aircraft.

Arranging a compact turbine engine coupled with a heat exchanger can also lead to a significant change in the position of the center of gravity of the aircraft, and that can have harmful impacts on the fin of the aircraft, for example. In particular, the vertical and horizontal stabilizers may then need to be dimensioned accordingly in order to guarantee static stability of the aircraft.

Document EP 1 216 190 describes an integrated engine and main gearbox.

A turbine engine is mounted in a housing, an main gearbox is incorporated in the housing and connected to the turbine. The main gearbox is mounted in a casing, with the casing and the housing being integrated with each other to constitute a single unit.

The turbine engine has a horizontal outlet shaft for driving the main gearbox.

Document FR 2 956 700 describes a turbine engine with an outlet shaft that extends substantially vertically under normal conditions of use, which shaft is held by a single bearing.

Document U.S. Pat. No. 5,226,350 describes an aircraft having a ring surrounding two contrarotating rotors. An engine is arranged within the ring in order to drive rotation of a hub carrying the contrarotating rotors. The engine is connected to the hub by a long shaft that tolerates axial, angular, and/or parallel misalignments between the hub and the engine.

Document U.S. Pat. No. 5,108,043 describes a helicopter power plant having two engines. Each engine drives a main gearbox via a transmission shaft having fluting at one end and carrying a gearwheel at its other end.

Document EP 0 760 777 describes a main gearbox having a planetary (epicyclic) gear train. An engine may also be connected to the main gearbox via bevel means.

Document DE 200 06 526 describes a shaft driving a rotor by means of a belt.

Those documents therefore do not provide teaching relating to arranging a power plant comprising a main gearbox that is driven in rotation by a compact turbine engine in co-operation with a heat exchanger.

Also known are the following documents: US 2005/115770 A1, U.S. Pat. No. 5,823,470 A, U.S. Pat. No. 5,054,716 A, GB 940 024 A, US 2011/121127 A1, and FR 2 905 983 A1.

Document US 2005/115770 A1 proposes an installation having a tilting gearbox.

Document U.S. Pat. No. 5,823,470 A describes an aircraft having two tilting rotors.

Document U.S. Pat. No. 5,054,716 A also describes a convertible aircraft having a turbine engine meshing with a main gearbox having a mast.

BRIEF SUMMARY OF THE INVENTION

An object of the present invention is thus to propose such a power plant.

According to the invention, a power plant is provided with a main gearbox and a turbine engine, the main gearbox having a substantially vertical rotor mast suitable for rotating a hub of a rotor, the turbine engine having an outlet shaft for driving said main gearbox, the power plant having a heat exchanger fastened on the turbine engine.

This power plant is remarkable in particular in that:

the main gearbox has at least one rotary speed reduction stage arranged in a flat casing and a pylon standing on a top face of the flat casing, the pylon having the rotor mast passing therethrough;

the turbine engine includes an engine casing, the outlet shaft projecting from the engine casing, the outlet shaft penetrating into the flat casing when the engine casing is arranged on the top face of the flat casing, the outlet shaft being substantially parallel to the rotor mast, the engine casing being offset longitudinally relative to the pylon and not being in contact with the pylon; and the heat exchanger extends longitudinally behind the turbine engine, said rotor mast being situated on the contrary longitudinally in front of the turbine engine.

This power plant is not a tilting installation. Since the pylon is held stationary relative to the flat casing, the turbine engine is prevented from moving relative to the flat casing and the power plant is stationary relative to a support platform.

In other words, the turbine engine is arranged between the rotor mast and the heat exchanger relative to a longitudinal direction going from front to rear of the power plant and/or of a vehicle having the power plant. An observer looking at the power plant from the side in a transverse direction can observe this characteristic.

The heat exchanger may be located exactly in a longitudinal position by being arranged in an anteroposterior plane of symmetry of the power plant and of a vehicle.

In a variant, the heat exchanger may be arranged obliquely by being placed in an oblique plane that extends in elevation and longitudinally at an angle relative to the anteroposterior plane. This angle can then be seen by an observer looking at the power plant along a direction in elevation.

The flat casing is said to be "flat" insofar as its dimension in elevation is very small compared with its longitudinal and transverse dimensions.

For example, its dimension in elevation is about 150 millimeters (mm) whereas its transverse dimension may be of the order of 500 mm, thus enabling a large wheel to be inserted therein, and its longitudinal dimension may be of the order of one meter, thus enabling a gear train to be inserted. The pylon may present a dimension in elevation of about 400 mm and a diameter of about 300 mm. These numerical values are given by way of example, in particular to illustrate the flat nature of the flat casing.

This power plant proposes an arrangement having two modules that are independent before they are fastened together, namely a main gearbox and a turbine engine, which is advantageously an engine such as a compact turbine engine. The two modules are therefore distinct and present two distinct casings.

Both the turbine engine and the main gearbox are thus independent and self-contained. For example, the turbine engine and the main gearbox may be certified independently of each other by the competent authorities.

A mechanical connection using a vertical outlet shaft enables these two modules to be mechanically connected together.

Thus, the turbine engine may be removed from a vehicle without impact on the main gearbox, and vice versa. An operator can replace a faulty turbine engine with another turbine engine, without difficulty.

The turbine engine is mechanically connected to the main gearbox by an outlet shaft that projects vertically from the engine casing. This characteristic imparts flexibility in use to the outlet shaft, which is capable of accommodating some degree of misalignment between the turbine engine and the main gearbox.

Furthermore, this power plant does not require connection means or angle drive takeoff means to be installed between the turbine engine and the main gearbox since the outlet shaft of the turbine engine is inserted directly in the main gearbox.

This power plant also makes it possible to avoid unduly degrading the aerodynamic performance of the aircraft.

It should be recalled that installing a turbine engine associated with a heat exchanger can have an impact on the frontal surface area of an aircraft.

However, the power plant of the invention suggests arranging the turbine engine in a substantially vertical position, unlike conventional configurations.

Under such circumstances, the heat exchanger may extend longitudinally in a substantially horizontal position in line with the turbine engine and within the dimensions of conventional covers, and thus it can occupy the space that is normally occupied by a power plant.

When the power plant is arranged on an aircraft, the heat exchanger then has little influence on the frontal surface area of the aircraft, since it lies in line with the turbine engine.

Furthermore, since the turbine engine is associated with a heat exchanger, the turbine engine may be a compact turbine engine, and may thus be small in size. Consequently, the turbine engine extends vertically over a height that remains reasonable. In addition, the main gearbox may comprise a casing that is flat because the outlet shaft is engaged directly in the main gearbox. This serves to optimize the height of the power plant.

In addition, the turbine engine extends longitudinally over a distance that is very short, thereby minimizing the impact of the heat exchanger on the balance of the aircraft. The assembly comprising the turbine engine and the heat exchanger extends longitudinally over a distance that is minimized by the turbine being arranged vertically. This arrangement thus has a positive effect on the position of the center of gravity of the aircraft, unlike solutions that have an impact on the vertical and horizontal stabilizers of an aircraft. The lever arm of the assembly comprising a turbine engine and a heat exchanger relative to a rotor mast tends to be small, thereby enabling the center of gravity of the aircraft to be moved close to the axis of rotation of the rotor.

Consequently, the synergy of these members of this power plant makes it possible to obtain a power plant that can present numerous unexpected advantages.

The power plant may include one or more of the following characteristics.

Thus, the power plant may include a firewall arranged between the engine casing and said pylon. The engine casing and the pylon are spaced apart from each other, thereby enabling a firewall to be inserted between them.

The firewall may comprise a plurality of panels for inserting in more general manner between the main gearbox and the turbine engine. Under such circumstances, the firewall may for example be provided with a vertical panel between the turbine engine and the pylon of the main gearbox, and in particular a horizontal panel interposed between the turbine engine and the flat casing.

Furthermore, the flat casing optionally extends longitudinally from a front segment carrying the pylon to a rear segment carrying the turbine engine. This characteristic serves in particular to enable the engine casing to be well separated from the pylon.

Furthermore, the flat casing can then receive a power reduction stage having a large wheel. Such a large wheel presents the advantage of being robust and less expensive than an epicyclic gear train, for example.

The outlet shaft may then mesh directly with the large wheel, or indirectly via an overrunning clutch or "freewheel", for example. Such a freewheel presents the advantage of allowing a lift rotor to rotate in auto-rotation in the event of the turbine engine becoming accidentally blocked.

The power plant may include a fluted connection arranged between the outlet shaft and the main gearbox.

Such a fluted connection may for example include a fluted endpiece secured to the outlet shaft.

In an embodiment, the fluted endpiece meshes with a large wheel, sometimes referred to as "gearing with a large toothed wheel". The large wheel is a circular toothed wheel thus presenting a large speed reduction ratio.

In contrast, in another embodiment, the fluted endpiece meshes with a freewheel of the main gearbox, the freewheel meshing with a rotary speed reduction stage. The freewheel may then mesh with a large wheel, for example.

Furthermore, the turbine engine may comprise a gas turbine having a gas generator and a working turbine secured to a working shaft.

The working shaft and the outlet shaft may coincide to form a single shaft.

Nevertheless, the working shaft and the outlet shaft may be distinct. Under such circumstances, the working shaft is advantageously substantially parallel to the rotor mast, and thus to the outlet shaft.

With the rotor mast, the outlet shaft, and the working shaft parallel to one another, the power plant does not require angle drive takeoff means for connecting them together in pairs.

Consequently, the turbine engine optionally includes a speed-reducer gear that is interposed in the engine casing between the working shaft and the outlet shaft. It can be understood that the engine casing may then possess a casing referred to as a "turbine casing" surrounding the gas turbine, and a casing referred to as a "reducer casing" surrounding the speed reducer. The turbine casing and the reducer casing are secured to each other. The turbine engine is thus modular and possesses a "gas turbine" module and a "speed reducer" module.

Under such circumstances, the speed of rotation of the working shaft may lie in the range 10,000 revolutions per minute (rpm) to 50,000 rpm, while the speed of rotation of the outlet shaft is reduced to the range 6000 rpm to 9000 rpm, for example. The gearing of the main gearbox can then reduce this speed of rotation to reach a speed of rotation of about 400 rpm at the rotor mast, for example.

Furthermore, the power plant may include connection means for fastening the engine casing to the flat casing, the connection means including a ring of bolts and a plurality of centering pegs. The connection means enable the turbine engine to be guided to the appropriate position with the help of the guide pegs, and enable the turbine engine to be fastened to the main gearbox with the help of the ring of bolts.

A firewall may be arranged at the interface between the turbine engine and the main gearbox.

In addition, said outlet shaft may project from said engine casing over a height greater than 10 centimeters (cm).

The outlet shaft is then long enough to be flexible. Such an outlet shaft can then accommodate the presence of angular deformation while the turbine is being mounted on the main gearbox.

The positioning of the turbine engine relative to the main gearbox needs to be relatively accurate in order to avoid leading to malfunction. A misalignment that is too great can lead to large forces on the members of the main gearbox, running the risk of leading to premature wear.

The presence of a "long" outlet shaft serves to give an operator a certain amount of latitude in adjustment. Furthermore, the presence of guide pegs facilitates correct positioning of the turbine engine.

Furthermore, the power plant may have a first lubrication system for lubricating the main gearbox and a second lubrication system for lubricating the turbine engine.

The modular structure of the power plant enables personalized lubrication systems to be put into place.

Thus, the first lubrication system optionally includes a mineral oil presenting good resistance to meshing pressures, and said second lubrication system of the turbine engine may include a synthetic oil presenting low viscosity and good ability to withstand high temperatures.

The turbine engine may include a dynamic seal through which the outlet shaft passes in order to isolate a space inside the turbine engine from a medium outside the turbine engine. Thus, the dynamic seal seeks for example to avoid a leak of lubricating fluid.

In addition, the pylon optionally includes suspension means for suspending the main gearbox to a support platform. Such suspension means may include oblique suspension bars suspending from the pylon to a platform.

The flat casing may also include a suspension device enabling it to be suspended relative to a platform.

The invention also provides an aircraft provided with a lift rotor comprising a hub and a plurality of blades. The aircraft includes a power plant of the above-described type.

Under such circumstances, said aircraft may include a support platform carrying said power plant, said power plant being stationary relative to said support platform.

The power plant is therefore not an assembly that tilts in the meaning of Documents US 2005/115770 A1, U.S. Pat. No. 5,823,470 A, or U.S. Pat. No. 5,054,716 A, for example.

BRIEF DESCRIPTION OF THE SEVERAL VIEWS OF THE DRAWINGS

The invention and its advantages appear in greater detail from the context of the following description of embodiments given by way of illustration with reference to the accompanying figures, in which.

DETAILED DESCRIPTION OF THE INVENTION

Elements that are present in more than one of the figures are given the same references in each of them.

Three mutually orthogonal directions X, Y, and Z are shown in some of the figures.

The first direction X is said to be "longitudinal".

The second direction Y is said to be "transverse".

Finally, the third direction Z is said to be "in elevation". The term "in elevation" relates to any direction parallel to the third direction Z.

Figure 1:
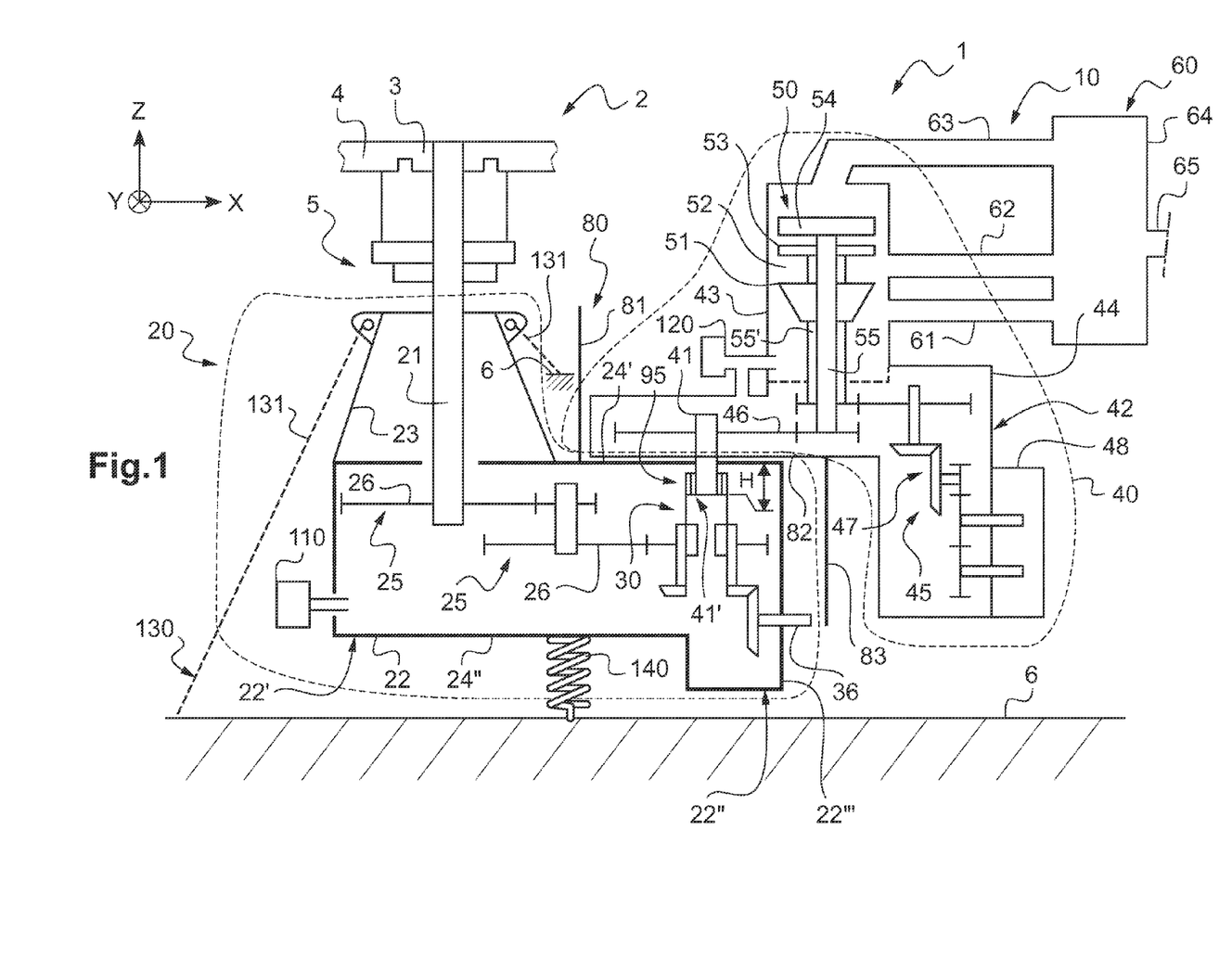
FIG. 1 is a diagram of an aircraft of the invention.

FIG. 1 shows an aircraft 1 having a power plant driving a rotor 2. The other members of the aircraft are not shown in order to avoid overloading FIG. 1.

The rotor 2 possesses a hub 3 carrying a plurality of blades 4. In addition, the rotor 2 includes for example a set of control plates 5 for controlling the pitch of the blades 4 cyclically and/or collectively.

In order to rotate the rotor 2, the aircraft has a power plant 10 carried by a support platform 6.

The power plant 10 has a turbine engine 40 coupled to a heat exchanger. The heat exchanger serves to heat the air compressed by a gas generator of the turbine engine before it is admitted into a combustion chamber.

The turbine engine then drives rotation of a main gearbox 20 having a rotor mast 21 carrying the hub 3.

To this end, the main gearbox 20 is provided with at least one rotary speed reduction stage 25 for driving the rotor mast 21 at a speed of about 400 rpm. Each rotary speed reduction stage 25 comprises gears arranged in a flat casing 22.

Figure 2:
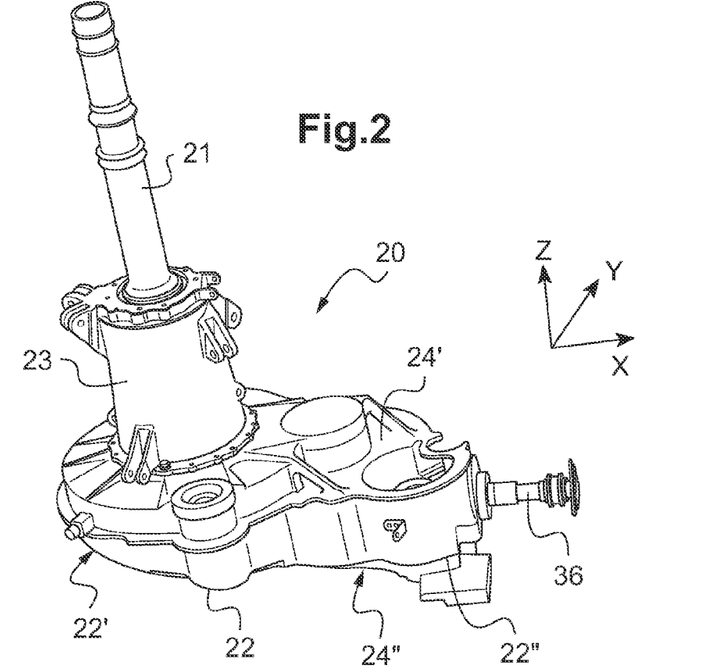
FIG. 2 is a view of a main gearbox of the invention.

With reference to FIG. 2, the flat casing extends in elevation from a bottom face 24" to a top face 24', and longitudinally from a front segment 22' to a rear segment 22". The dimension of the flat casing in elevation is less than the longitudinal and transverse dimensions of the flat casing. That is why the casing is said to be a "flat" casing.

The rotor mast 21 also passes through a pylon 23 fastened to the top face 24' of the flat casing 22. The rotor mast 21 then extends along a direction in elevation that is directed substantially along the gravity direction when the aircraft is on the ground.

With reference to FIG. 1, the turbine engine 40 has a gas turbine 50 arranged in an engine casing 42.

The turbine engine 40 also has an outlet shaft 41 that is driven in rotation by the gas turbine 50. This outlet shaft projects out from the engine casing 42, preferably over a height H of more than 10 cm.

The outlet shaft 41 is then inserted into the flat casing. The engine casing is then fastened to the top face 24' of the flat casing. For example, the power plant has fastener means including a ring 90 of bolts and a plurality of centering pegs 91 that can be seen in particular in FIG. 5.

Figure 5:
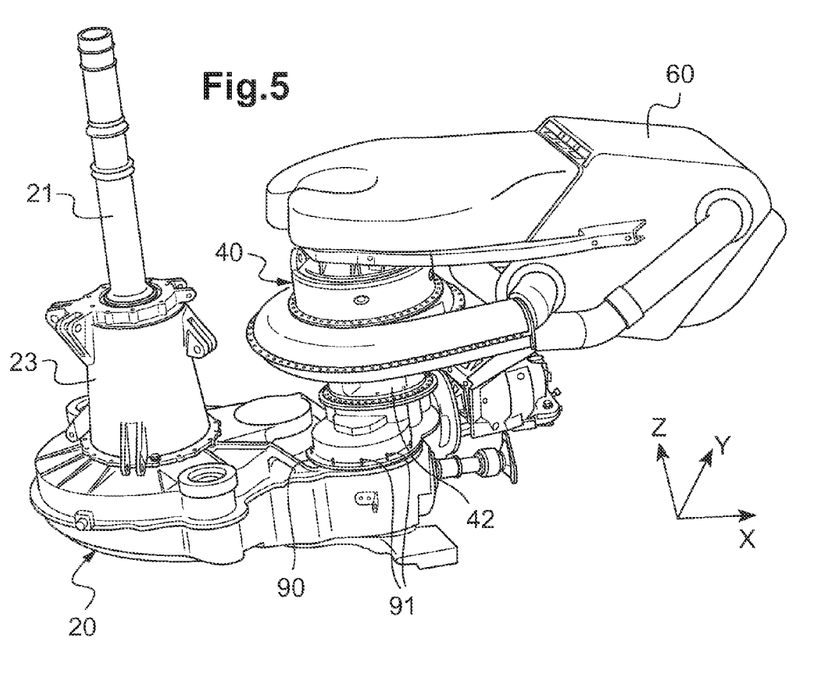
FIG. 5 is a view of a power plant.

The centering pegs serve to position the engine casing correctly relative to the flat casing.

With reference to FIG. 1, the outlet shaft 41 is then parallel to the rotor mast 21. Nevertheless, the outlet shaft 41 is offset, in particular longitudinally, relative to the rotor mast 21. The pylon 23 is fastened to the front segment 22' of the flat casing, whereas the turbine engine 40 is fastened to the rear segment 22" of the flat casing 22.

Consequently, the engine casing 42 is longitudinally offset relative to the pylon 23, and is not in contact with the pylon 23.

This arrangement makes it possible in particular to arrange a firewall 80 between the engine casing 42 and the pylon 23.

More generally, the firewall may separate the turbine engine 40 from the main gearbox 20 in order to isolate the turbine engine in a compartment defining a zone referred to as the "hot" zone.

For example, the firewall then has a plurality of panels 81, 82, and 83, such as a vertical panel 81 between the engine casing 42 and the pylon 23, a horizontal panel 82 between the top face 24' of the flat casing and the turbine engine, and another vertical panel 83 between the engine casing 42 and a side face 22''' of the flat casing 22.

Furthermore, this arrangement makes it possible to install at least one rotary speed reduction stage 25 that includes a toothed wheel of large diameter which may be referred to as a large wheel 26.

The outlet shaft 41 of the turbine engine 40 can then mesh directly or indirectly with a large wheel 26.

Consequently, the power plant includes a fluted connection 95 between the outlet shaft 41 and the main gearbox 20.

Figure 6:
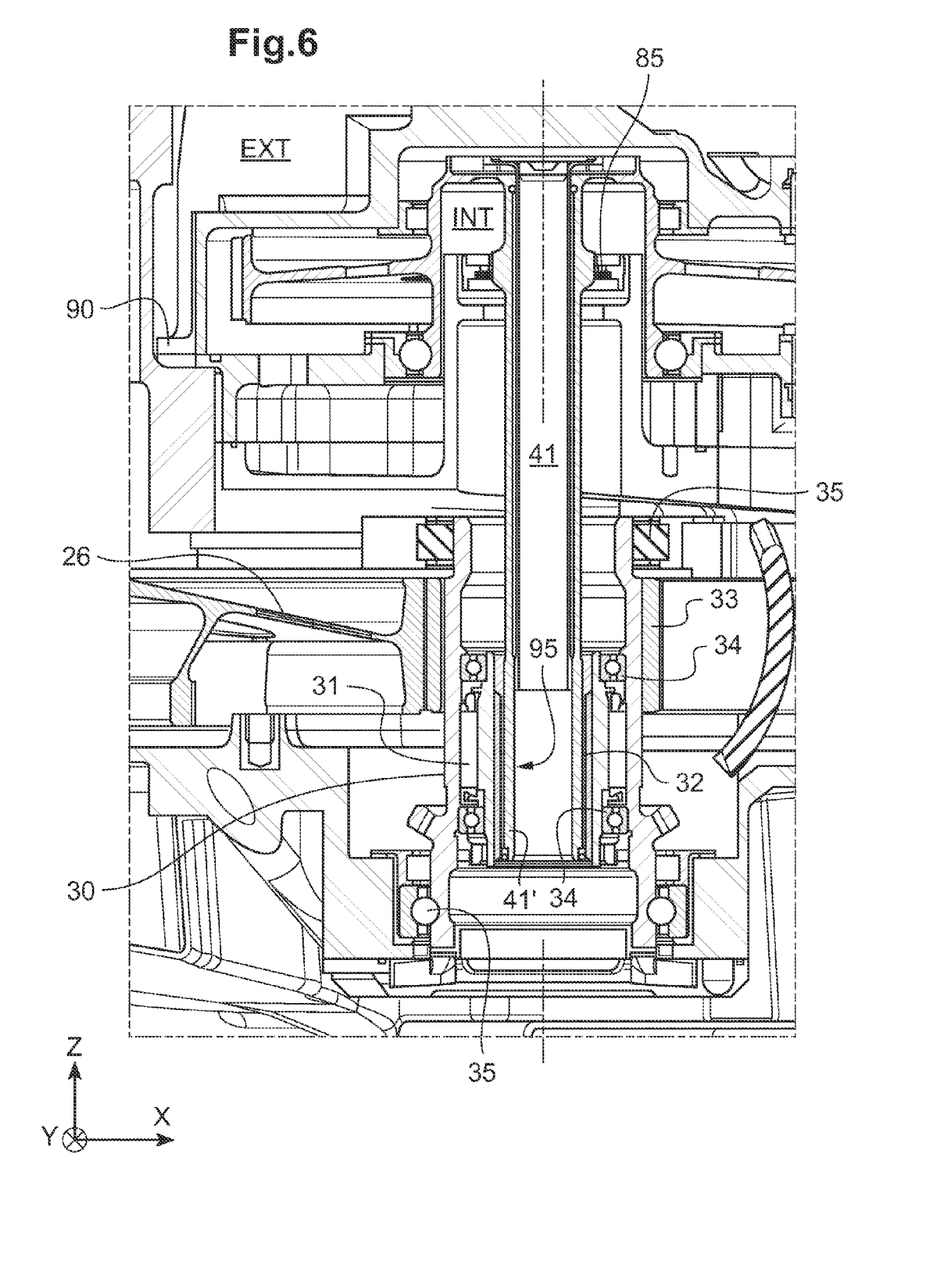
FIG. 6 is a section view showing an outlet shaft meshing with the main gearbox.

The fluted connection shown in FIG. 6 includes a fluted endpiece 95 secured to the outlet shaft 41. This fluted endpiece 95 may then be a portion of the outlet shaft 41.

Furthermore, the fluted connection may also include a freewheel 30. The freewheel 30 has a driving portion 32 co-operating with a driven portion 33 via rollers or wheels 31. The freewheel 30 may also include bearing means 34 interposed between the driving portion 32 and the driven portion 33. The bearing means 35 may also guide the rotation of the driven portion 33.

The fluted endpiece 95 of the outlet shaft 41 then engages with the driving portion 32 of the freewheel 30 of the main gearbox. The driven portion of the freewheel 30 then meshes with a toothed wheel 26.

The turbine engine 40 may also include a dynamic seal 85 for sealing the inside INT of the turbine engine 40 from a medium EXT situated outside the turbine engine 40. This dynamic seal 85 then has the outlet shaft 41 passing therethrough.

With reference to FIG. 1, the driven portion of the freewheel 30 may also mesh with gears to rotate an auxiliary shaft 36. This auxiliary shaft serves to rotate a rotor for controlling yaw movement of the aircraft 1, for example.

This arrangement thus makes it possible to obtain a power plant having a compact turbine engine extending in elevation from a flat casing of an main gearbox.

Furthermore, this arrangement serves to minimize the impacts of installing a heat exchanger 60 on the turbine engine. The heat exchanger 60 extends longitudinally from the turbine engine 40 in line with the turbine engine 40 and the rotor mast 21.

Consequently, the rotor mast 21 is longitudinally in front of the turbine engine 40, while the heat exchanger 60 is longitudinally behind the turbine engine 40.

The invention thus enables a compact turbine engine to be provided that is in co-operation with a heat exchanger.

The turbine engine 40 may comprise a gas generator arranged within the engine casing in order to drive the outlet shaft.

The gas turbine 50 comprises a gas generator followed by at least one turbine. The gas generator sucks in fresh air from the medium EXT outside the turbine engine in order to generate hot gas that rotates at least one turbine 53, 54. The gas generator thus comprises both a compressor 51 having at least one compression stage, and also a combustion chamber 52.

The turbine engine may also possess a drive turbine 53 connected to the compressor, and then a working turbine 54 connected to a working shaft 55.

The gas turbine extends in elevation. By way of example, the combustion chamber is situated above the compressor, the working turbine being situated above the combustion chamber. The working shaft then passes through the combustion chamber and the compressor, extending parallel to the rotor mast 21.

The working shaft 55 may also coincide with the outlet shaft 41.

Nevertheless, a speed-reducer gear 45 is optionally interposed inside the engine casing 42 between the working shaft 55 and the outlet shaft 41. The speed reducer 45 may thus comprise gears 46 for driving the outlet shaft 41 under drive from the working shaft.

Likewise, the turbine engine may include gears 47 that mesh with an intermediate shaft 55' of the gas generator and that are mechanically connected to accessories 48.

Figure 3:
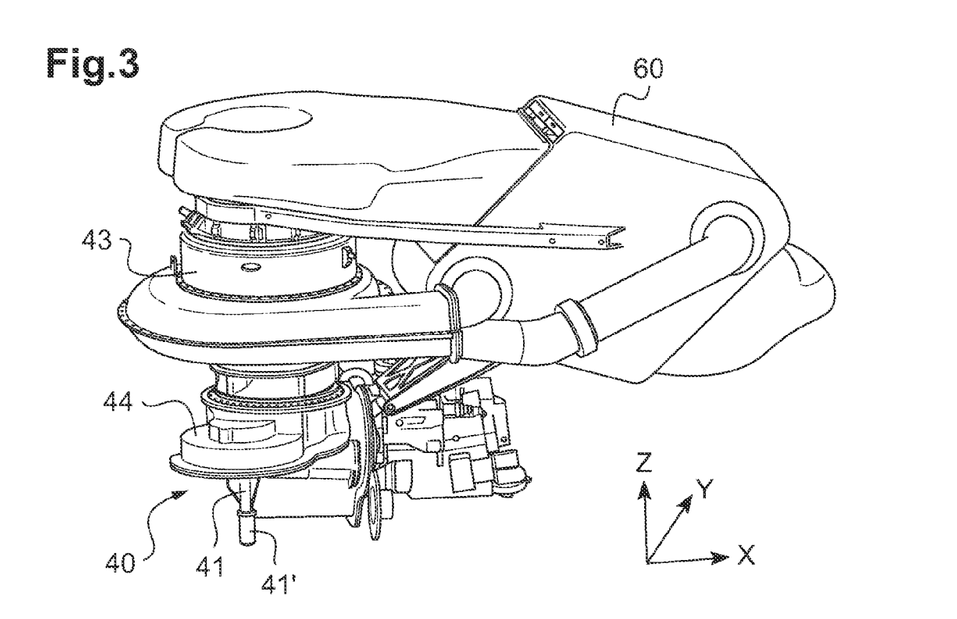
FIGS. 3 and 4 are views of a turbine engine coupled to a heat exchanger.
Figure 4:
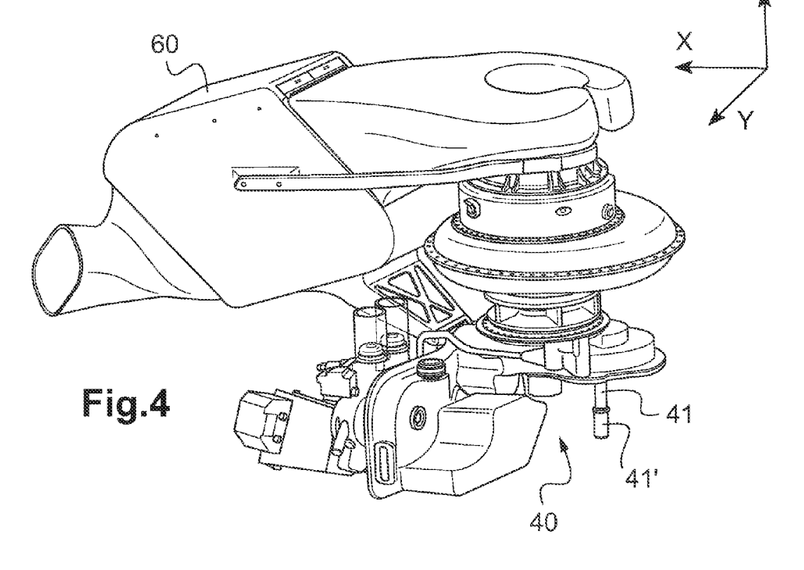

With reference to FIGS. 3 and 4, the engine casing 42 may then be split into a turbine casing 43 surrounding the gas turbine and a speed-reducer casing 44 surrounding the speed reducer 45. The gears 47 may be arranged in the casing of the speed reducer. The turbine casing then has a top casing surrounding the gas turbine, the speed-reducer casing constituting a lower casing surrounding the speed reducer 45 and gears connected to accessories.

With reference to FIG. 1, the heat exchanger may seek to heat fresh air as compressed by the compressor of the gas turbine prior to penetrating into the combustion chamber.

Under such circumstances, the heat exchanger 60 comprises a heat exchanger block 64 fed with fresh air coming from the compressor 51 via a first inlet pipe 61. The heat exchanger block 64 then feeds the combustion chamber 52 with hot air via a first outlet pipe 62.

In order to heat the fresh air, the heat exchanger block 64 is fed with hot gas coming from the gas turbine via a second inlet pipe 63. The heat exchanger block 64 expels the hot gas to the atmosphere via a second outlet pipe 65.

Reference may be made to the literature in order to obtain a description of such a heat exchanger.

Furthermore, the power plant 10 shown in FIG. 1 has a first lubrication system 110 for lubricating the main gearbox 20. This first lubrication system 110 serves for example to inject mineral oil into the flat casing 22 in order to lubricate the gears of the speed-reducer stages 25.

Likewise, the power plant has a second lubrication system 120 for lubricating the turbine engine 40. The second system 120 serves for example to inject synthetic oil into the engine casing.

Furthermore, the power plant may be fastened to a platform 6 of an aircraft by suspension means 30. By way of example, the suspension means 130 include suspension bars 131 extending obliquely from the pylon 23 towards the support platform 6. The suspension means may include anti-vibration members.

Furthermore, suspension means 140 may optionally be interposed between the flat casing 22 and the support platform 6, e.g. between the bottom face 24" and the support platform 6.

Although the power plant is suspended, it is held stationary relative to the support platform in the sense that the power plant does not have any member that rocks in order to move a rotor from a lift-providing position to a traction-providing position, for example.

Thus, the pylon and the turbine engine are stationary relative to the flat casing and they are not tilting.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A power plant having a main gearbox and a turbine engine, the main gearbox having a substantially vertical rotor mast suitable for rotating a hub of a rotor, the turbine engine having an outlet shaft for driving said main gearbox, said power plant having a heat exchanger fastened on said turbine engine, wherein:

said main gearbox has at least one rotary speed reduction stage arranged in a flat casing and a pylon standing on a top face of said flat casing, said pylon having said rotor mast passing therethrough;

said turbine engine includes an engine casing, said outlet shaft projecting from said engine casing, said outlet shaft penetrating into said flat casing when said engine casing is arranged on said top face, said outlet shaft being substantially parallel to the rotor mast, said engine casing being offset longitudinally relative to the pylon and not being in contact with the pylon; and said heat exchanger extends longitudinally behind said turbine engine, said rotor mast being situated on the contrary longitudinally in front of said turbine engine.

2. A power plant according to claim 1, wherein said power plant includes a firewall arranged between the engine casing and said pylon.

3. A power plant according to claim 1, wherein said flat casing extends longitudinally from a front segment carrying said pylon to a rear segment carrying said turbine engine.

4. A power plant according to claim 1, wherein said turbine engine comprises a gas turbine having a gas generator and a working turbine secured to a working shaft (55), said working shaft being substantially parallel to the rotor mast.

5. A power plant according to claim 1, wherein said turbine engine includes a speed-reducer gear that is interposed in the engine casing between a working shaft and said outlet shaft.

6. A power plant according to claim 1, wherein said turbine engine includes a dynamic seal through which said outlet shaft passes in order to isolate a space inside the turbine engine from a medium outside the turbine engine.

7. A power plant according to claim 1, wherein said power plant includes connection means for fastening the engine casing to the flat casing, said connection means including a ring of bolts and a plurality of centering pegs.

8. A power plant according to claim 1, wherein said power plant includes a fluted connection between said outlet shaft and said main gearbox.

9. A power plant according to claim 8, wherein said fluted connection has a fluted endpiece secured to the outlet shaft, said fluted endpiece meshing with a freewheel of the main gearbox, said freewheel meshing with a rotary speed reduction stage.

10. A power plant according to claim 9, wherein said freewheel meshes with a large wheel.

11. A power plant according to claim 1, wherein said outlet shaft projects from said engine casing over a height greater than 10 cm.

12. A power plant according to claim 1, wherein said power plant has a first lubrication system for lubricating the main gearbox and a second lubrication system (120) for lubricating the turbine engine.

13. A power plant according to claim 12, wherein said first lubrication system includes a mineral oil, said second lubrication system for lubricating the turbine engine including a synthetic oil.

14. A power plant according to claim 1, wherein said pylon includes suspension means for suspending the main gearbox to a support platform.

15. A power plant according to claim 1, wherein said pylon and said turbine engine are stationary relative to said flat casing.

16. An aircraft having a lift rotor comprising a hub and a plurality of blades, wherein said aircraft includes a power plant according to claim 1.

17. An aircraft according to claim 16, wherein said aircraft includes a support platform carrying said power plant, said power plant being stationary relative to said support platform.

* * * * *